(12) United States Patent
Lee et al.

(10) Patent No.: US 10,962,050 B2
(45) Date of Patent: Mar. 30, 2021

(54) AIR BLOWER FOR VEHICLE

(71) Applicant: Hanon Systems, Daejeon (KR)

(72) Inventors: Jong Sung Lee, Daejeon (KR); Hyun Chil Kim, Daejeon (KR); Gun Woong Park, Daejeon (KR); Chi Yong Park, Daejeon (KR); Hyun Sup Yang, Daejeon (KR); Kyu Sung Choi, Daejeon (KR)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 16/679,447

(22) Filed: Nov. 11, 2019

(65) Prior Publication Data

US 2020/0149583 A1 May 14, 2020

(30) Foreign Application Priority Data

Nov. 14, 2018 (KR) .................. 10-2018-0139905
Oct. 25, 2019 (KR) .................. 10-2019-0133863

(51) Int. Cl.

| *F16C 17/04* | (2006.01) |
|---|---|
| *F16C 27/04* | (2006.01) |
| *F16C 43/02* | (2006.01) |
| *F16C 33/10* | (2006.01) |
| *F04D 29/05* | (2006.01) |
| *F01D 25/16* | (2006.01) |
| *F16C 17/02* | (2006.01) |
| *F04D 29/051* | (2006.01) |
| *F16C 37/00* | (2006.01) |

(52) U.S. Cl.
CPC ........ *F16C 17/024* (2013.01); *F04D 29/0513* (2013.01); *F16C 27/045* (2013.01); *F16C 37/002* (2013.01); *F16C 43/02* (2013.01); *F01D 25/166* (2013.01); *F16C 17/042* (2013.01); *F16C 2226/76* (2013.01); *F16C 2360/00* (2013.01)

(58) Field of Classification Search
CPC .... F16C 17/024; F16C 17/042; F16C 27/045; F16C 37/002; F16C 43/02; F16C 33/1065; F16C 29/0513; F16C 2226/76; F16C 2360/00; F04D 29/0513; F04D 29/057; F05D 2240/52
USPC .......................................... 384/103, 105, 106
See application file for complete search history.

(56) References Cited

U.S. PATENT DOCUMENTS 4,277,113 A * 7/1981 Heshmat ............... F16C 17/024
 384/124
6,158,892 A * 12/2000 Stewart .................. F16C 17/042
 384/105

(Continued)

FOREIGN PATENT DOCUMENTS

CN 106704361 A * 5/2017 ............ F16C 17/024
CN 108050085 A * 5/2018
(Continued)

*Primary Examiner* — Marcus Charles
(74) *Attorney, Agent, or Firm* — Norton Rose Fulbright US LLP; James R. Crawford

(57) ABSTRACT

A vehicle air compressor including a shaft provided with an impeller disposed at one side thereof and a runner disposed at the other side thereof, a motor configured to rotate the shaft, a trust bearing which supports the shaft in a longitudinal direction of the shaft and of which a surface is disposed adjacent to a surface of the runner, wherein a cooling hole for cooling air between the trust bearing and the runner is disposed in the trust bearing.

11 Claims, 5 Drawing Sheets

(56) References Cited

U.S. PATENT DOCUMENTS

| | | | |
|---|---|---|---|
| 8,602,653 B2* | 12/2013 | Heshmat | F16C 37/002 |
| | | | 384/103 |
| 8,801,290 B2 | 8/2014 | Heshmat | |
| 9,970,481 B1* | 5/2018 | van der Steur | F16C 32/0614 |
| 10,138,934 B2* | 11/2018 | Omori | F16C 27/02 |
| 2015/0030270 A1* | 1/2015 | Heshmat | F16C 17/042 |
| | | | 384/106 |
| 2017/0321744 A1* | 11/2017 | Ha | F16C 17/042 |

FOREIGN PATENT DOCUMENTS

| | | | | |
|---|---|---|---|---|
| CN | 108054852 A | * | 5/2018 | |
| CN | 108223135 A | * | 6/2018 | |
| CN | 108252956 A | * | 7/2018 | F04D 29/584 |
| KR | 20020066409 A | * | 8/2002 | F16C 17/042 |
| KR | 20170061486 A | | 6/2017 | |
| KR | 20170061507 A | | 6/2017 | |
| WO | WO-2009131269 A1 | * | 10/2009 | F16C 17/042 |
| WO | WO-2015141506 A1 | * | 9/2015 | F04D 25/06 |
| WO | WO-2017199695 A1 | * | 11/2017 | F01D 25/22 |
| WO | WO-2017218058 A1 | * | 12/2017 | F04D 29/051 |
| WO | WO-2018030657 A1 | * | 2/2018 | F16C 37/00 |

\* cited by examiner

AIR BLOWER FOR VEHICLE

CROSS-REFERENCE TO RELATED APPLICATION

This application claims priority to and the benefit of Korean Patent Application No. 2018-0139905 filed on Nov. 14, 2018 and No. 2019-0133863 filed on Oct. 25, 2019, the disclosure of which is incorporated herein by reference in its entirety.

BACKGROUND

Field of the Invention

The present invention relates to a vehicle air compressor. More specifically, the present invention relates to a vehicle air compressor with an improved cooling path so as to improve durability of a bearing and cooling efficiency.

Discussion of Related Art

Generally, fuel cell vehicles are vehicles in which electric energy generated through electrochemical reactions, which are reverse reactions of electrolysis, of water generated by hydrogen and oxygen being supplied to humidifiers is provided as a driving force therefor, and a general fuel cell vehicle is disclosed in Korean Patent Registration No. 0962903.

Generally, fuel cell passenger vehicles include a fuel cell stack having a power of 80 kW class installed therein, and in a case in which the fuel cell stack is driven in a pressing condition, since air having a high pressure ranging from 1.2 to 3.0 bar is supplied to the fuel cell stack, an air compressor having revolutions per minute (rpm) ranging from five thousands to a hundred thousand rpm should be used.

Generally, fuel cell vehicles include a fuel cell stack which generates electricity, a humidifier which humidifies fuel and air and supplies the fuel and the air to the fuel cell stack, a fuel supplier which supplies hydrogen to the humidifier, an air supplier which supplies air including oxygen to the humidifier, a cooling module configured to cool the fuel cell stack, and the like.

The air supplier includes an air cleaner which filters foreign materials included in air, an air compressor which compresses air filtered by the air cleaner and supplies the compressed air, and a control box which controls the air compressor.

The air compressor compresses air suctioned from the outside using an impeller and sends the compressed air to the fuel cell stack through an outlet. Here, the impeller and a shaft included in the compressor are driven by a rotational force of a motor.

However, the conventional air compressor has a problem in that cooling performance is not high because a space adjacent to a bearing is narrow, and cooling air should pass through a narrow gap and cool the bearing, the motor, and the like. Particularly, since a temperature of a journal bearing positioned behind the motor and the air compressor easily increases, damage may occur to the bearing.

RELATED ART DOCUMENT

Korean Patent Publication No. 10-2017-0061507.
Korean Patent Publication No. 10-2017-0061486.

SUMMARY OF THE INVENTION

The present invention is directed to a vehicle air compressor with an improved cooling path so as to improve durability of a bearing and cooling efficiency.

Objectives to be solved by the present invention are not limited to the above-described objectives, and other objectives which are not described above will be clearly understood by those skilled in the art from the following descriptions.

According to an aspect of the present invention, there is a vehicle air compressor including a shaft provided with an impeller disposed at one side thereof and a runner disposed at the other side thereof, a motor configured to rotate the shaft, and a thrust bearing which supports the shaft in a longitudinal direction of the shaft and of which a surface is disposed adjacent to a surface of the runner, wherein a cooling hole for cooling air between the thrust bearing and the runner is disposed in the thrust bearing.

The thrust bearing may be disposed on each of two surfaces of the runner.

The cooling hole may be disposed in the thrust bearing disposed at a side adjacent to the impeller.

The cooling hole may include a first through hole and a second through hole.

A first housing cover and a second housing cover may be provided in front of and behind the runner, the first housing cover may include a back plate connected to a rear portion of the first housing cover and a plurality of top foils disposed to be spaced apart from each other on the back plate, and a plurality of first through holes forming a first auxiliary cooling path and a plurality of second through holes passing through the back plate to form a second auxiliary cooling path may be disposed in the first housing cover.

The second through holes may be disposed between the top foils.

A center of the second through hole may be disposed at a position corresponding to a half of a height of the top foil.

A cover groove may be formed in the rear portion of the first housing cover, and the second through holes may be disposed in the cover groove.

The cover groove may be formed in a diameter direction of the first housing.

The cover groove may be disposed in an interspace formed by arranging the top foils.

The second housing cover may include the back plate connected to a front portion of the second housing cover and the plurality of top foils spaced apart from each other on the back plate, and the second through holes may be disposed between the top foils.

The second through hole formed in the second housing cover may have a slope formed in a direction toward an entrance of a hollow formed in the shaft.

The thrust bearing may further include a bump foil disposed between the top foil and the back plate to buffer an axial force of the shaft.

Air passing through a cooling path may be introduced into the bump foil.

The first through holes may be disposed outside an outermost line of the disposed top foils.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
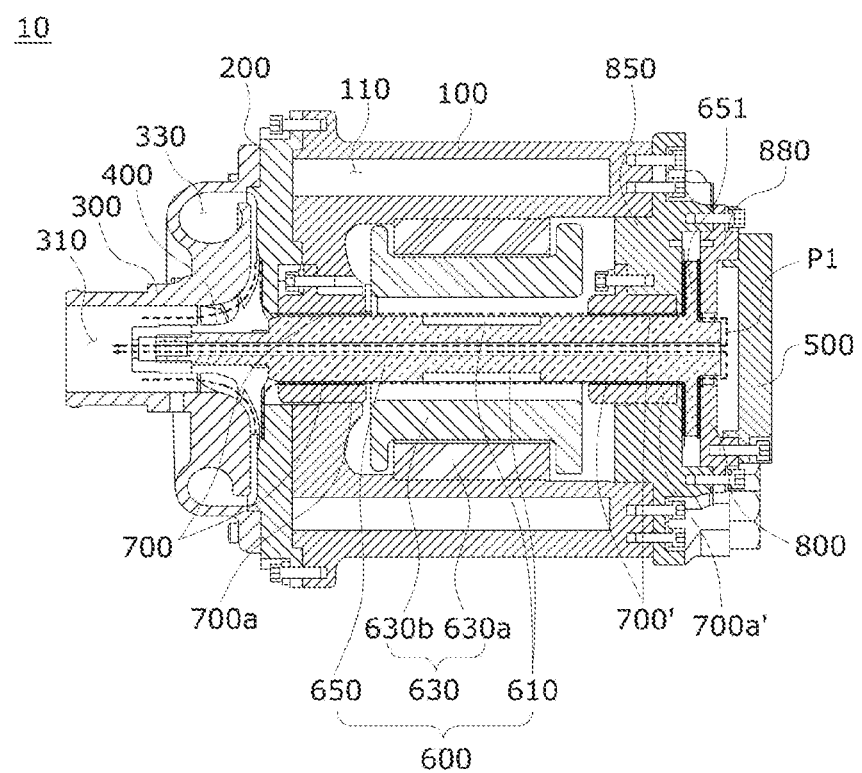
FIG. 1 is a side cross-sectional view illustrating an air cooling path of a vehicle air compressor according to the present invention.

Hereinafter, exemplary embodiments of the present invention will be described with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all combinations which can be combined with A, B, and C.

In descriptions of components of the present invention, terms such as "first," "second," "A," "B," "(a)," and "(b)" can be used.

The terms are only to distinguish one element from another element, and an essence, order, and the like of the element are not limited by the terms.

It should be understood that, when an element is referred to as being "connected or coupled" to another element, such a description may include both a case in which the element is directly connected or coupled to another element, and a case in which the element is connected or coupled to another element by still another element disposed therebetween.

In a case in which any one element is described as being formed or disposed "on or under" another element, such a description includes both cases in which the two elements are formed or disposed to be in direct contact with each other and one or more other elements are interposed between the two elements. In addition, when one element is described as being formed "on or under" another element, such a description may include a case in which the one element is formed at an upper side or a lower side with respect to another element. Hereinafter, example embodiments of the invention will be described below in detail with reference to the accompanying drawings. Components that are the same or correspond to each other are denoted by the same reference numerals regardless of the figure numbers, and redundant descriptions will be omitted.

Since FIGS. 1 to 8 are views illustrating only portions of main features so as to conceptually clearly facilitate understanding of the present invention, various changes may be expected as a result, and the scope of the present invention does not need to be limited to specific forms illustrated in the drawings.

A vehicle air compressor according to an embodiment of the present invention includes a shaft 650 provided with an impeller 400 disposed at one side thereof and a runner 651 disposed at the other side thereof, a motor 600 configured to rotate the shaft 650, and thrust bearings 800 which support the shaft 650 in a longitudinal direction of the shaft 650 and of which surfaces are disposed adjacent to a surface of a runner 651, wherein cooling holes for cooling air between the thrust bearings 800 and the runner 651 are disposed in the thrust bearings 800.

Objectives of the present invention are to use the cooling holes so as to improve cooling efficiency and increase a load supporting force by increasing a flow rate of a fluid, which is generated in high speed rotation, at an inlet of the thrust bearings 800 using path characteristics.

In the present invention, the thrust bearings 800 may be disposed at two sides of the runner 651.

As an example, the cooling holes may be disposed in the thrust bearing 800 disposed at a side adjacent to the impeller. However, the cooling holes are not limited thereto, and the cooling holes may be disposed in the two thrust bearings 800 to improve cooling efficiency.

The cooling holes may include first through holes 850 and second through holes 1000, 1000a, 1000b, or 1000c, and the first through holes 850 and the second through holes 1000, 1000a, 1000b, or 1000c will be distinguished and described below.

FIG. 1 is a side cross-sectional view illustrating an air cooling path of a vehicle air compressor according to the present.

Referring to FIG. 1, a vehicle air compressor 10 according to an embodiment of the present invention may include a housing 100 forming an exterior, an impeller support 200 and an impeller housing 300 which support an impeller 400 which is coupled to a front portion of the housing 100 and suctions air, a rear cover 500 coupled to a rear portion of the housing 100, and a blower motor 600 installed in the housing 100 and configured to rotate the impeller 400. An air inlet 310 through which external air is introduced is formed at a front center of the impeller housing 300, and air outlets 330 are formed in two front sides thereof. The impeller 400 is installed in the impeller housing 300, and a shaft 650 of the blower motor 600, which will be described below, is coupled to a hollow which passes through the impeller 400. That is, the impeller 400 is supported by the shaft 650. Air introduced by the impeller 400 through the air inlet 310 is compressed by the impeller 400 and discharged through the air outlet 330.

The rear cover 500 is coupled to the rear portion of the housing 100, blocks the shaft 650 from being exposed to the outside, and supports an end portion of the shaft 650. A housing cover 850 is provided inside the rear cover 500 and supports a rear bearing casing 700a' which will be described below.

The blower motor 600 includes a stator 630 installed adjacent to an inner circumferential surface of the housing 100 and having a hollow (a numeral is not shown), the shaft 650 installed to pass through the hollow of the stator 630, and a rotor 610 coupled to an outer circumferential surface of the shaft 650.

The stator 630 includes a plate 630a and a coil 630b and is fixed, the rotor 610 is integrally formed with the circumferential surface of the shaft 650, and the shaft 650 is a hollow shaft in which a hollow is formed to pass therethrough in a longitudinal direction.

In a state in which the shaft 650 is coupled to the hollow of the impeller 400, one end portion of the shaft 650 is rotatably supported by a journal bearing 700 disposed behind the impeller 400, and the other end portion thereof is rotatably supported by a thrust bearing 800 (hereinafter, for the sake of convenience, one end portion of the motor shaft in a direction toward the impeller is defined as a portion in a front direction, and the other end portion thereof is defined as a portion in a rear direction). That is, the thrust bearing 800 is disposed behind the shaft 650.

When power is provided to the blower motor 600 from the outside and the blower motor 600 operates, the shaft 650 rotates to rotate the impeller 400, and external air is introduced through the air inlet 310, compressed while passing through the impeller 400, and discharged through the air outlet 330. A cooling water jacket 110 is provided inside the housing 100 in order to cool heat generated while the blower motor 600 operates.

The cooling water jacket 110 is disposed inside the housing 100 to wrap an inner surface of the housing 100, and cooling water is provided and stored in the cooling water jacket 110. Since the cooling water jacket 110 is provided adjacent to the blower motor 600, the cooling water jacket 110 serves to cool the blower motor 600 by exchanging heat with the cooling water. A water cooling method using the cooling water jacket 110 to cool the blower motor 600 and an air cooling method using air to cool the blower motor 600 may be used together.

An air cooling path P1 communicates with a main path which communicates with the air inlet 310, the impeller 400, and the air outlet 330.

The air cooling path P1 extends to the rear cover 500 by passing through between the impeller 400 and the impeller support 200, between the front journal bearing 700 and the shaft 650, between a rear journal bearing 700' and the shaft 650, and between the thrust bearing 800 and the shaft 650. In addition, the air cooling path P1 communicates with the air inlet 310 by passing through between the rear cover 500 and the shaft 650 and passing through a hollow which passes through a center of the shaft 650.

The above-described path is the air cooling path P1, and some air compressed by the impeller 400 is discharged toward the air inlet 310 after circulating along the air cooling path P1 to cool the front journal bearing 700, the blower motor 600, and the thrust bearing 800.

When the thrust bearing 800 is disposed at the rear portion thereof, an air temperature in the blower motor 600 and an air temperature in the front journal bearing 700 are decreased when compared to a case in which the thrust bearing 800 is disposed at a front portion thereof. In addition, since the thrust bearing 800 is disposed at the rear portion thereof, the thrust bearing 800 is positioned adjacent to the cooling water jacket 110, and thus there is an effect in that an overall system temperature decreases.

Figure 2:
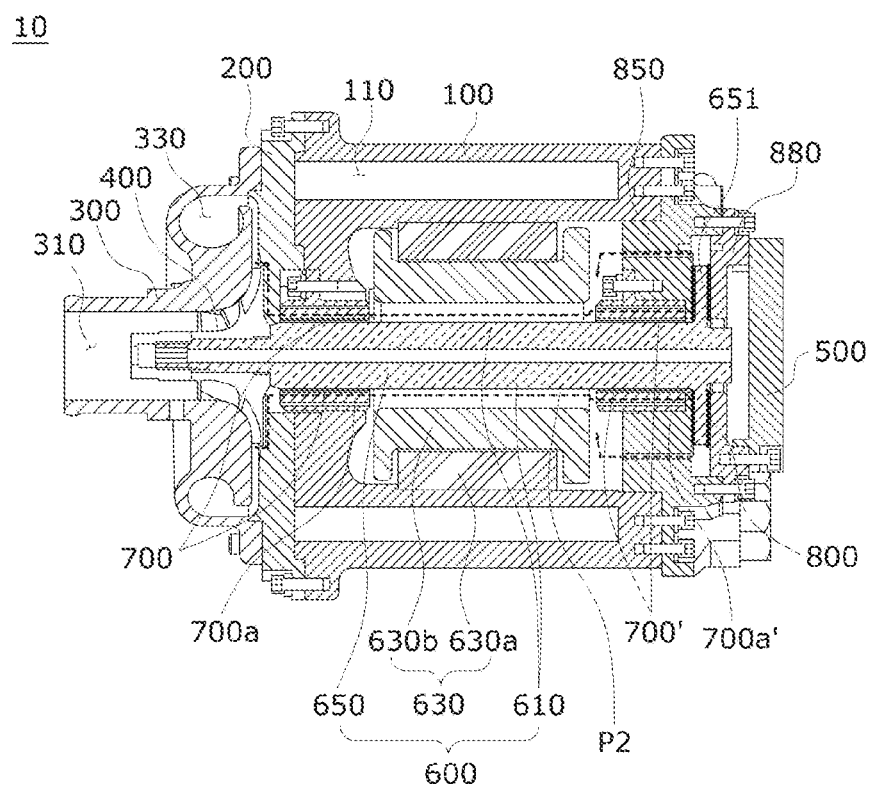
FIG. 2 is a side cross-sectional view illustrating a first auxiliary cooling path of the vehicle air compressor of FIG. 1.

FIG. 2 is a side cross-sectional view illustrating a first auxiliary cooling path of the vehicle air compressor of FIG. 1.

Referring to FIG. 2, a first auxiliary cooling path P2 may be further provided according to an embodiment of the present invention.

A first housing cover 850 is disposed in front of the thrust bearing 800, and a second housing cover 880 may be disposed behind the thrust bearing 800.

The second auxiliary cooling path P2 is a cooling path in which through holes are primarily formed in a bearing casing 700a of the front journal bearing 700 and the bearing casing 700a' of the rear journal bearing 700', a first through hole is secondarily formed in the first housing cover 850 adjacent to the cooling water jacket 110, and the through hole is connected to the first through hole. The first auxiliary cooling path P2 allows some air, which passes through the impeller 400, to be cooled by cooling water while the some air passes through the front bearing casing 700a, is provided to the rear bearing casing 700a' and flows toward first through holes 851 formed in the first housing cover 850.

Figure 3:
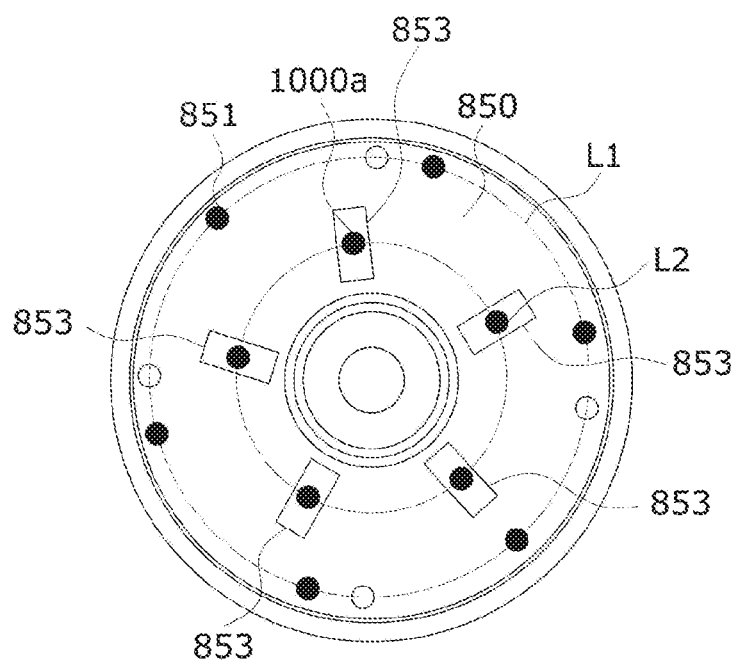
FIG. 3 is a view illustrating a structure of a housing cover which is a part according to the present invention.
Figure 4:
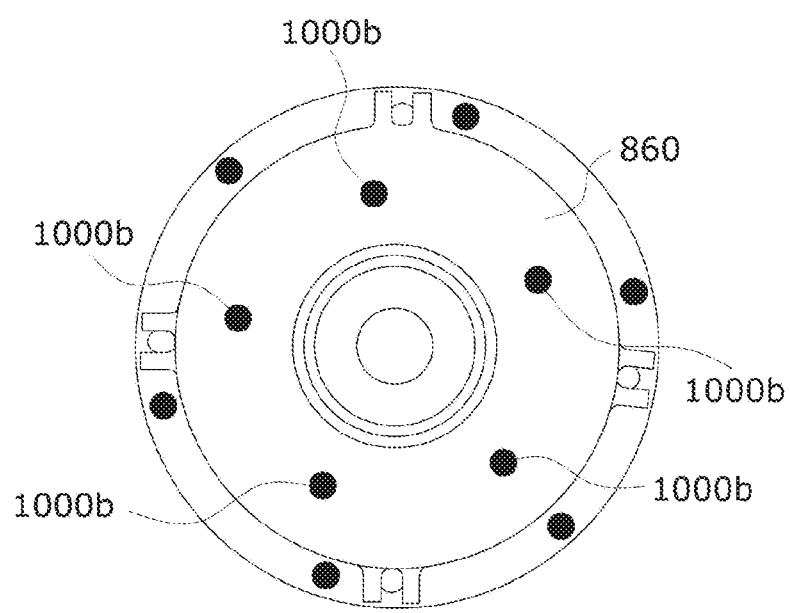
FIG. 4 is a view illustrating a structure of a back plate of a thrust bearing which is a part according to the present invention.
Figure 5:
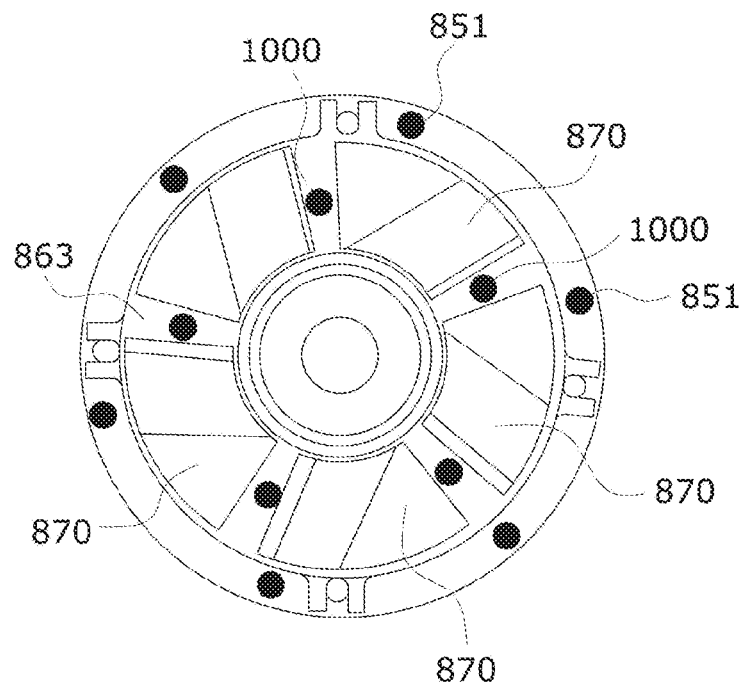
FIG. 5 is a view illustrating a state in which top foils are disposed on the thrust bearing of FIG. 4.
Figure 6:
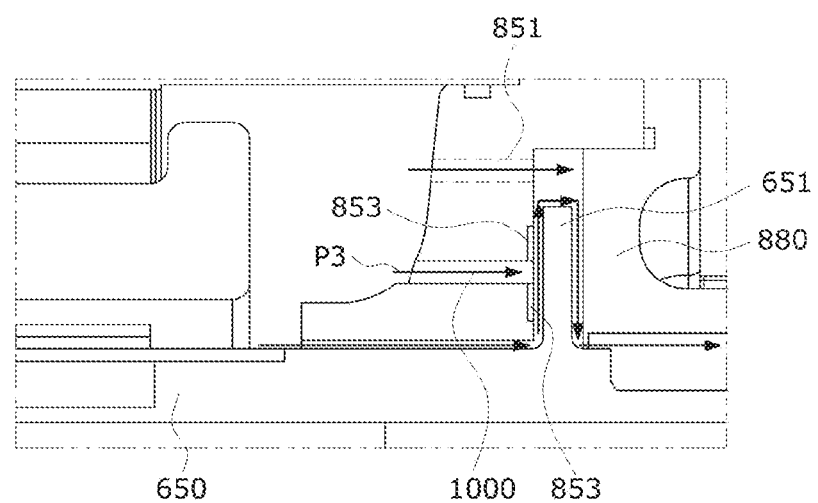
FIG. 6 is a view illustrating a flow of cooling air according to one embodiment of the present invention.
Figure 7:
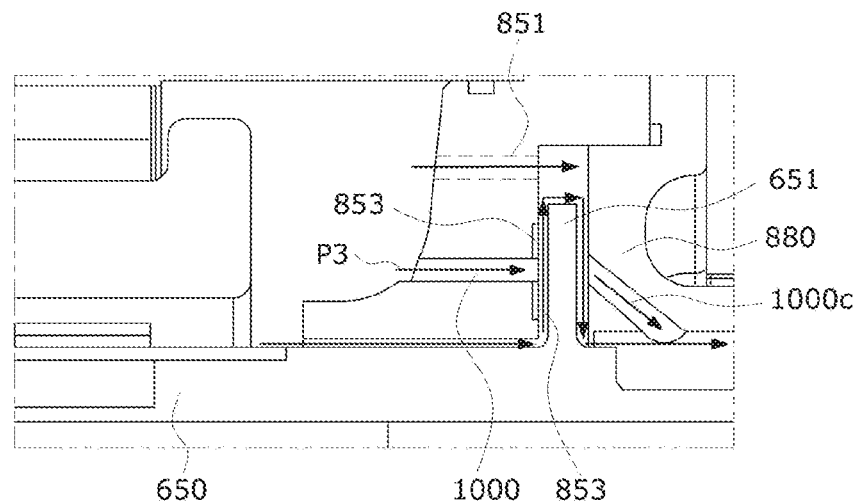
FIG. 7 is a view illustrating a flow of cooling air according to another embodiment of the present invention.
Figure 8:
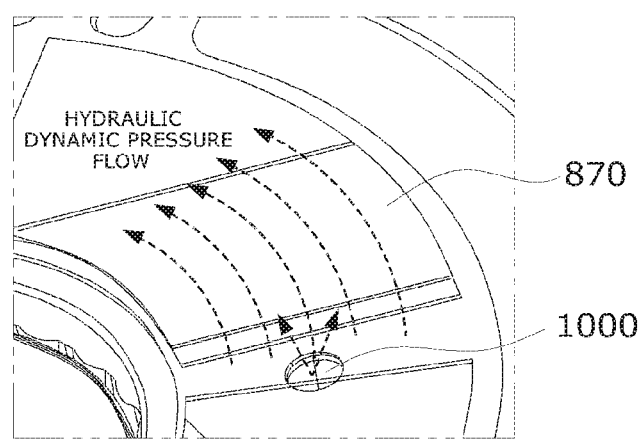
FIG. 8 is a view illustrating the flow of cooling air over a top foil on the thrust bearing of FIG. 6.

FIG. 3 is a view illustrating a structure of a housing cover which is a part according to the present invention, FIG. 4 is a view illustrating a structure of a back plate of a thrust bearing which is a part according to the present invention, FIG. 5 is a view illustrating a state in which top foils are disposed on the thrust bearing of FIG. 4, FIG. 6 is a view illustrating a flow of cooling air according to one embodiment of the present invention, FIG. 7 is a view illustrating a flow of cooling air according to another embodiment of the present invention, and FIG. 8 is a view illustrating the flow of cooling air over a top foil on the thrust bearing of FIG. 6.

In the thrust bearing according to the embodiment of the present invention, a structure of a thrust air foil bearing will be described. The thrust air foil bearing supports an axial force of the shaft and has a structure in which a plurality of foils are disposed to overlap.

Referring to FIGS. 3 to 5, the first housing cover 850 which is a part according to the present invention may include a back plate 860 connected to a rear portion of the first housing cover 850 and a plurality of top foils 870 disposed to be spaced apart from each other on the back plate 860.

The back plate 860 may be provided to have a disc shape so that the shaft may be inserted into the back plate 860 and may be coupled to the rear portion of the first housing cover 850.

The plurality of top foils 870 may be disposed on the back plate 860. The top foil 870 may have a shape in which an end portion of a fan shape is cut to have a curved line, and the adjacent top foils 870 may be disposed to be spaced apart from each other so that interspaces 863 may be formed.

Bump foils (not shown) which buffer the axial force of the shaft may be provided inside the top foils 870. One end portion of the top foil 870 may be coupled to the back plate 860, and the other end portion thereof may be formed as a free end portion.

The bump foils (not shown) may be disposed between the top foils 870 and the back plate 860 to support the axial force of the shaft. The bump foil (not shown) is formed in a fan plate shape and is in contact with the top foil 870 at a position between the fixed end portion and the free end portion of the top foil 870. The plurality of first through holes 851 forming the first auxiliary cooling path P2 may be disposed in the first housing cover 850 along an outer line L2 of which a rotation center is the same as that of the shaft 650.

Here, the first through holes 851 may be disposed outside an outermost line at which the plurality of top foils 870 are disposed. As an embodiment, the number of the first through holes 851 may be a number in which 360° is divided by an integer, and in this case, the first through holes 851 may be disposed to have the same angle therebetween.

In addition, a plurality of second through holes 1000 may be disposed which pass through the first housing cover 850 and the back plate 860 to form a second auxiliary cooling path P3. Here, the second through holes 1000 may be disposed between the top foils 870. Here, second through holes 1000*a* which pass through the first housing cover 850 and second through holes 1000*b* which pass through the back plate 860 may be disposed on the same line, and the second through holes 1000 may be formed to be almost parallel to the shaft 650, that is, formed in a vertical direction.

As an embodiment, the plurality of second through holes 1000 may be disposed in the interspaces 863 formed on the back plate 860 by the top foils 870 being disposed. In other words, the interspaces 863 formed by arranging the top foils 870 may be disposed to be spaced a predetermined distance from each other in a diameter direction. Here, the second through holes 1000 may be disposed to be spaced the predetermined distance from each other at the interspaces 863 so as to increase an introduction amount of cooling air.

As shown in FIGS. 3 to 5, the second through hole 1000 may be formed to have a circular cross-section but may have a different shape in consideration of cooling efficiency. Here, the second through holes 1000 may have different widths and heights. This means that widths and heights of the interspaces 863 may be different in the diameter direction.

A center of the second through hole 1000 may be positioned at a position corresponding to a half of a height of the top foil 870. In other words, the center of the second through hole 1000 may be disposed on a central line L1 which connects points corresponding to a half of the height of the top foil 870. This is for cooling air to uniformly spread toward the top foils 870.

The air passing through the cooling path may cool the top foils 870, be introduced to the bump foils, cool the bump foils, and be discharged along the hollow.

Cover grooves 853 may be formed in a rear portion of the first housing cover 850, and the second through holes 1000 formed in the first housing cover 850 may be disposed in the cover grooves 853.

The cover grooves 853 provide spaces in which air introduced through the first housing cover 850 is accommodated before being introduced into the second through holes 1000 formed in the back plate 860. Accordingly, cooling efficiency can be improved.

As an embodiment, the cover grooves 853 may be disposed in the diameter direction of the first housing and may be disposed in the interspaces 863 formed by arranging the top foils 870. In addition, the plurality of second through holes 1000 may be disposed in the cover groove 853 to increase a flow rate of cooling air.

In addition, a second housing cover 880 may be disposed behind a runner 651 of the shaft. The second housing cover 880 may include a back plate 860 and a plurality of top foils 870 disposed to be spaced apart from each other on the back plate 860 like the first housing cover 850.

Here, second through holes 1000 formed in the second housing cover 880 may be provided to have the same arrangement structure as the second through holes 1000 formed in the first housing cover 850. However, since the first auxiliary cooling path P2 is not formed in the second housing cover 880 unlike the first housing cover 850, first through holes 851 are not formed.

In other words, this means that the second through holes 1000*c* for forming a flow in the second auxiliary cooling path P3 may be formed in the back plates 860 and the second housing cover 880. The second through hole 1000*c* may secure a flow rate of a cooling fluid to improve cooling efficiency.

However, the second through holes 1000 formed in the second housing cover 880 may be obliquely provided toward an entrance of the hollow formed in the shaft unlike the second through holes 1000 formed in the first housing cover 850. Accordingly, air which completes cooling of the thrust bearing 800 can flow through two paths so as to improve cooling efficiency.

In the present invention, an auxiliary cooling path is provided to cool the thrust bearing which is a main heating part of the vehicle air compressor 10. The second through holes 1000 of the first housing cover 850 are set at specific arrangement positions so as to increase a movement amount of air and a time period in which the air comes into contact with the thrust bearing, and the second through holes 1000 formed in the second housing cover 880 serve to discharge air which completes cooling.

Accordingly, the second through holes 1000 formed in the second housing cover 880 may be obliquely disposed toward the hollow to quickly dispose the air which completes the cooling.

Referring to FIGS. 6 to 8, cooling air introduced through the second through holes 1000 is directly introduced into the second through holes 1000 formed between the top foils 870.

Here, the cooling air introduced into the interspaces 863 of the top foils 870 may increase a hydraulic dynamic pressure at an inclined section of each of the top foils 870, and the cooling air which flows along the top foils 870 may cool the bump foils (not shown) and be discharged along the hollow to improve cooling efficiency of the thrust bearing, and thus a load supporting force can be increased.

As described above, cooling efficiency can be improved and a load supporting force can be increased by increasing a flow rate of a fluid at an inlet of a thrust bearing, which is generated in high speed rotation, using path characteristics.

Various useful advantages and effects of the present invention are not limited to the above-described contents and will be more easily understood in the above-described detailed embodiments of the present invention.

As described above, the embodiments of the present invention have been described with reference to the accompanying drawings.

The above description is only an example describing a technological scope of the present invention. Various changes, modifications, and replacements may be made by those skilled in the art without departing from the spirit and scope of the present invention. Therefore, the embodiments disclosed above and in the accompanying drawings should be considered in a descriptive sense only and not for limiting the technological scope. The technological scope of the present invention is not limited by the embodiments and the accompanying drawings. The scope of the present invention should be interpreted by the appended claims and encompass all equivalents falling within the scope of the appended claims.

What is claimed is:

1. A vehicle air compressor comprising:
a shaft provided with an impeller disposed at one side thereof and a runner disposed at the other side thereof;
a motor configured to rotate the shaft; and
a thrust bearing which supports the shaft in a longitudinal direction of the shaft and of which a surface is disposed adjacent to a surface of the runner,
wherein a cooling hole for cooling air between the thrust bearing and the runner is disposed in the thrust bearing,
wherein the cooling hole includes a first through hole and a second through hole,
wherein a first housing cover is provided in front of the runner and a second housing cover is provided behind the runner;
wherein the first housing cover includes a back plate connected to a rear portion of the first housing cover and a plurality of top foils disposed to be spaced apart from each other a rear portion of the back plate; and
a plurality of first through holes forming a first auxiliary cooling path and a plurality of second through holes passing through the back plate to form a second auxiliary cooling path are disposed in the first housing cover.

2. The vehicle air compressor of claim 1, wherein the thrust bearing is disposed on each of two surfaces of the runner.

3. The vehicle air compressor of claim 2, wherein the cooling hole is disposed in the thrust bearing disposed at a side adjacent to the impeller.

4. The vehicle air compressor of claim 1, wherein the second through holes are disposed between the top foils.

5. The vehicle air compressor of claim 4, wherein a center of the second through hole is disposed at a position corresponding to a half of a height of the top foil.

6. The vehicle air compressor of claim 4, wherein:
a cover groove is formed in the rear portion of the first housing cover; and
the second through holes are disposed in the cover groove.

7. The vehicle air compressor of claim 6, wherein the cover groove is formed in a diameter direction of the first housing.

8. The vehicle air compressor of claim 7, wherein the cover groove is disposed in an interspace formed by arranging the top foils.

9. The vehicle air compressor of claim 1, wherein:
the second housing cover includes the back plate connected to a front portion of the second housing cover and the plurality of top foils spaced apart from each other on the back plate; and
the second through holes are disposed between the top foils.

10. The vehicle air compressor of claim 9, wherein the second through hole formed in the second housing cover has a slope formed in a direction toward an entrance of a hollow formed in the shaft.

11. The vehicle air compressor of claim 1, wherein the first through holes are disposed outside an outermost line of the disposed top foils.

* * * * *